US012569991B2

(12) United States Patent
Holmberg et al.

(10) Patent No.: US 12,569,991 B2
(45) Date of Patent: Mar. 10, 2026

(54) VARIABLE PAYLOAD ROBOT

(71) Applicant: Dexterity, Inc., Redwood City, CA (US)

(72) Inventors: Robert Holmberg, Mountain View, CA (US); Gil Matzliach, Sunnyvale, CA (US); Samir Menon, Menlo Park, CA (US); Zhouwen Sun, San Mateo, CA (US); Prabhat Kumar Sinha, Santa Clara, CA (US)

(73) Assignee: Dexterity, Inc., Redwood City, CA (US)

( * ) Notice: Subject to any disclaimer, the term of this patent is extended or adjusted under 35 U.S.C. 154(b) by 84 days.

(21) Appl. No.: 18/501,303

(22) Filed: Nov. 3, 2023

(65) Prior Publication Data

US 2024/0149462 A1 May 9, 2024

Related U.S. Application Data

(60) Provisional application No. 63/422,334, filed on Nov. 3, 2022.

(51) Int. Cl.
B25J 9/16 (2006.01)

(52) U.S. Cl.
CPC ............. B25J 9/1638 (2013.01); B25J 9/162 (2013.01); B25J 9/1664 (2013.01); B25J 9/1697 (2013.01)

(58) Field of Classification Search
CPC ............. B25J 9/162; B25J 9/1602–1607; B25J 9/1638; B25J 9/1664; B25J 9/1669; B25J 9/1671; B25J 9/1682; B25J 9/1697
See application file for complete search history.

(56) References Cited

U.S. PATENT DOCUMENTS

| | | | | |
|---|---|---|---|---|
| 5,336,982 | A * | 8/1994 | Backes | B25J 9/1682 |
| | | | | 318/568.22 |
| 2020/0205918 | A1 | 7/2020 | Uekaji | |
| 2020/0206913 | A1 | 7/2020 | Kaehler | |
| 2021/0001484 | A1 | 1/2021 | Bogart | |
| 2021/0069889 | A1 | 3/2021 | Jacobsen | |
| 2021/0237270 | A1* | 8/2021 | Minoya | B25J 9/1607 |
| 2022/0088780 | A1* | 3/2022 | Abdul-Hadi | B25J 9/1664 |
| 2022/0315358 | A1 | 10/2022 | Ryan | |
| 2024/0198526 | A1* | 6/2024 | Aparicio Ojea | B25J 9/1669 |

OTHER PUBLICATIONS

Boston Dynamics, "Handle Robot Reimagined for Logistics," Mar. 28, 2019, https://www.youtube.com/watch?v=5iV_hB08Uns (Year: 2019).*

* cited by examiner

*Primary Examiner* — Spencer D Patton
(74) *Attorney, Agent, or Firm* — Van Pelt, Yi & James LLP

(57) ABSTRACT

A variable payload robot is disclosed. In various embodiments, a robot includes two or more joints, each actuated by an associated joint motor and each joint motor having a different capacity, the robot comprising an end effector configured to grasp an object. A processor coupled to the robot is configured to determine based at least in part on the respective capacities of at least a subset of the joint motors and a payload related attribute of the object a plan and trajectory to move the object from a source location to a destination location.

20 Claims, 10 Drawing Sheets

Spec : 5kg payload

Up to 25kg payload

500

700

704

VARIABLE PAYLOAD ROBOT

CROSS REFERENCE TO OTHER APPLICATIONS

This application claims priority to U.S. Provisional Patent Application No. 63/422,334 entitled VARIABLE PAYLOAD ROBOT filed Nov. 3, 2022 which is incorporated herein by reference for all purposes.

BACKGROUND OF THE INVENTION

Industrial robot arms are designed for performing a variety of precision tasks, typically with pre-determined motions and payloads. Manufacturers conservatively create design and operational specifications that set an identical standard of performance across the robot's work envelope. These specifications typically are set as hard constraints in the hardware, firmware, and/or drivers. This always under-utilizes the hardware since robots have variable performance capabilities across the work envelope.

BRIEF DESCRIPTION OF THE DRAWINGS

Various embodiments of the invention are disclosed in the following detailed description and the accompanying drawings.

DETAILED DESCRIPTION

Figure 1A:
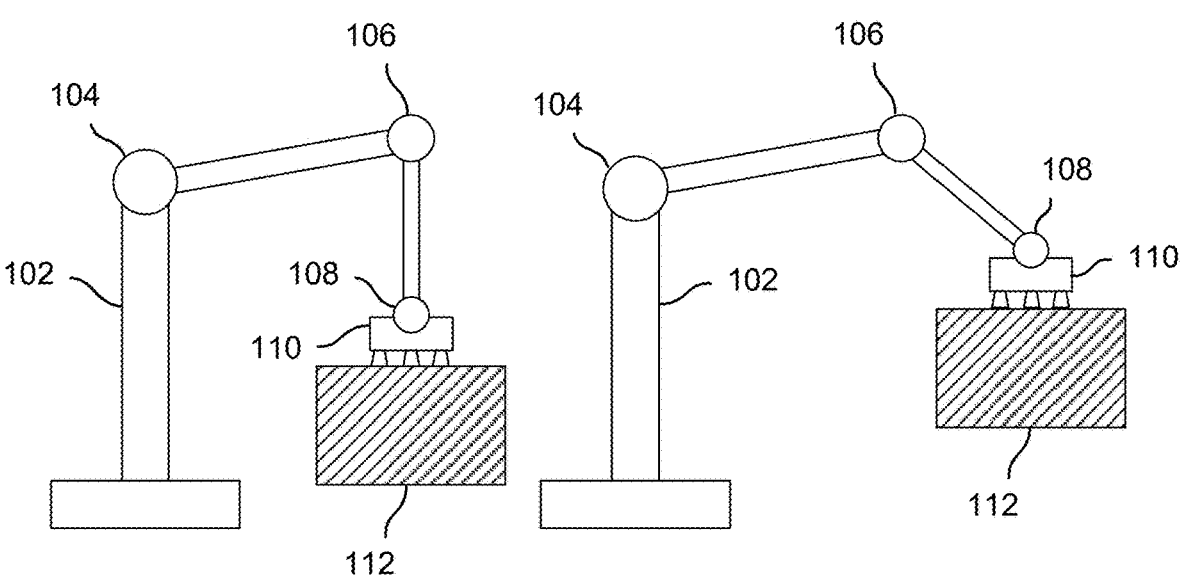
FIG. 1A is a diagram illustrating an embodiment of a variable payload robotic system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to specify design and operating parameters for robots consistent with their physical ability to operate with variable performance across a work envelope. In various embodiments, techniques disclosed herein are used to enable robots to do precision and non-precision tasks with dynamically computed motions and variable or unknown payloads.

In various embodiments, robot physics, motion dynamics, operating payload, robot motor capabilities, control systems, joints, limbs, gripper(s) and/or a plurality of other capabilities are considered to determine, e.g., dynamically, in real time, how the capabilities of the robot may be used, within applicable constraints, to perform a given task. Benefits achieved in various embodiments include one or more of:

Allowing for the construction of lighter and more capable robots that are focused on performance for specific sets of tasks, but with highly variable motions, operating conditions, and payloads.

Allowing intelligent control and machine learning systems to utilize the maximum capabilities of the robot across the entire work envelope.

Dramatically improving the design and operation of multiple robot arms that are working in a collaborative manner.

In various embodiments, techniques disclosed herein enable one of more of the following: building and programming imprecise robots, reducing robot machine weight, lowering power consumption, task-specific robots, identifying and executing physical motions that minimize control errors, and improving force and touch control. While specific applications, such as sorting parcels or loading trailers with robots, are discussed, in various embodiments techniques disclosed herein may be used in a variety of other contexts.

In some contexts, a robot may have knowledge of payload mass (weight). Examples are knowledge of payload mass from work planning software, weigh station at pickup point, wrist-mounted force sensor, payload (or type) identification via computer vision and lookup, etc. Using knowledge of payload mass, a motion planner component of the robotic system can apply techniques disclosed herein to choose an appropriate path and destination. For example, the planner may choose to dangle a heavier payload from its "elbow" or other penultimate joint, which puts less stress on the final (e.g., "wrist") joint and the link or limb connected to it.

FIG. 1A is a diagram illustrating an embodiment of a variable payload robotic system. In the example shown in FIG. 1A, at left, a robotic arm comprising a base segment 102, motor-driven shoulder joint 104, motor-driven elbow joint 106, motor-driven wrist joint 108, and a suction-type gripper 110 are shown at left in a position in which object 112 is dangling below and moved nearer to the robot, e.g., to reduce the stress on the "wrist" joint 108 (e.g., no required torque) and the link above the wrist (e.g., only subjected to tensile load, not bending).

Referring further to FIG. 1A, in the example shown at right the object 112 is held and/or has been moved to a position further away from the base segment 102. In various embodiments, a control system configured to control the robotic arm of FIG. 1A may have determined, for example, with respect to the example shown on the right side of FIG. 1A that given the known or estimated weight of the object 112 the robotic arm 102, 104, 106, 108, 110 could hold the object 112 in the position and orientation shown. For example, the system may have determined based on the weight or object 112, the respective torque limits of the motors driving joints 104, 106, and/or 108, and the strength of the links connecting said joints that the robotic arm and its component elements could hold object 112 at the position and orientation shown. A heavier object, for example, may instead have been determined as being required to be held in the position as shown on the right side of FIG. 1A.

In various embodiments, a robotic system as disclosed herein is configured with an awareness of its hardware components and the capacity (abilities) and limitations (constraints) of each. In the conventional approach, the maximum torque of the respective motors (and associated gearboxes), the design maximum payload of limbs (links) comprising a robotic arm, etc. are considered in determining at a system level a maximum rating for the robot in different configurations, poses, etc. These limits are hardcoded in firmware, resulting in a "stop" being generated if a robotic control system were to attempt to exceed them. Typically, the conventional approach results in strict enforcement of limits or guardrails that result in the robot being greatly underutilized.

In the approach disclosed herein, by contrast, a robotic control system knows the capabilities and limits of individual components comprising the robot and takes that information into consideration in determining, in real time, how to (best) use the robot's capabilities to perform a given task. This approach, sometimes referred to herein as "hardware self-aware" robotic control, enables the capabilities the robot to be utilized more fully. For example, in FIG. 1A, the robotic system may determine it is able to lift a payload in the manner shown at left that is much heavier than the robot could lift in the pose as shown at right.

Figure 1B:
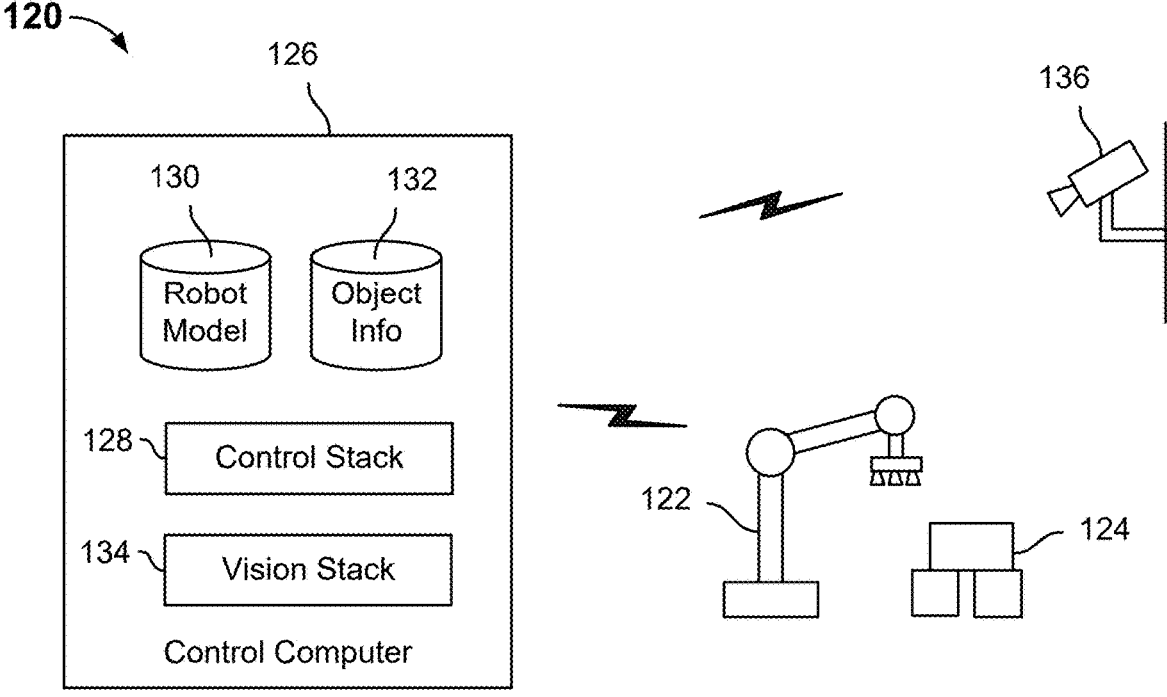
FIG. 1B is a block diagram illustrating an embodiment of a variable payload robotic system.

FIG. 1B is a block diagram illustrating an embodiment of a variable payload robotic system. In the example shown, system 120 includes a robotic arm 122 positioned and configured to pick and place boxes 124 stacked near the robotic arm 122. The robotic arm 122 is in communication, e.g., via conventional wireless communications, with control computer 126. Control computer 126 may comprise one or more processors, computer memory, and wireless communication interfaces. In the example shown, control computer 126 includes a control stack 128 comprising one or more processing modules, which cooperate to provide commands to the robotic arm 122 to manipulate the boxes 124. For example, control stack 128 may include a motion planner configured to determine a trajectory to move the end effector of robotic arm 122, once it has been used to grasp a box 124, through a determined trajectory in three-dimensional space, to place the box 124 in a destination location at a prescribed orientation.

In the example shown, control stack 128 uses a robot model 130 and an object attribute store 132 to determine how to pick and place the boxes 124 as disclosed herein. For example, robot model 130 may include a kinematic model of the robotic arm 122, which the control stack 128 may use to determine the physical reach of the robotic arm 122, the various combinations of joint positions the arm 122 may be capable of being moved into, etc. In addition, the joint-specific capabilities of the robotic arm 122 may be stored in robot model 130. For example, the torque capacities or limits of the respective joint motors may be stored. In various embodiments, the control stack 128 may use the joint and/or link level capabilities and/or limits of the elements comprising the robotic arm 122 and attributes of a given box 124 read from the object attribute store 132 to determine a set of one or more feasible trajectories for the robotic arm 122 to be used to move the given box 124 from a source location to a destination location.

Referring further to FIG. 1B, in the example shown the control computer 126 further includes a computer vision stack 134 configured to receive and process image data received from 3D camera 136, which is shown to be positioned in the workspace with a view of robotic arm 122 and the boxes 124. In various embodiments, vision stack 134 includes a component configured to extract from images generated camera 136 data usable to look up the attributes of a given box 124 from the object attribute store 132. For example, text or other information printed on a box 124 may be recognized and used to perform a lookup. In another example, the vision stack 134 may use image data from camera 136 to determine an attribute more directly, such as by recognizing a weight printed on the side of the box 124 and/or recognizing a printed warning that the box 124 is "heavy". In various embodiments, control stack 128 uses object attribute data determined at least in part from image data processed by vision stack 134 to determine a plan and trajectory to move a given box 124 from a source location to a destination location.

In various embodiments, trajectories with different payloads and maneuvers are simulated prior to runtime (i.e., prior to undertaking to plan and perform a given task) to enable the robotic system to learn its capabilities and/or the limits to its capabilities for a given payload, context, task, etc. In some embodiments, the robot design is iterated given the detailed and/or granular capabilities of the robot and its components, as described above, on a per box (payload) level. For example, the robot may learn through simulation that it cannot lift or move a payload above a certain weight in the configuration shown at right above, but it can do so in the "dangling" configuration at left. In some embodiments, the robot uses simulation at run time to decide in real time between different locations to place a box or other payload, given the physical joint limits, for example, or different strategies to grasp and/or plans to move the payload. In some embodiments, the robot uses simulation at run time to respond in real time to a detected condition, such as the object is heavier than expected, a joint is less capable than expected (e.g., due to heat or other environmental conditions; wear; impending failure; etc.), an obstacle is encountered along the way, etc.

In various embodiments, one or more of the following technical challenges are overcome using techniques disclosed herein:

1. System able to compute the capabilities of a robot to move with a plurality of payloads while doing a specific task (instead of having pre-set capabilities for any task).

Intelligent and dynamic control to compute the feasibility of achieving robot motion and force control for a variety of desired motion trajectories and payloads. And then use this information to expand capabilities.

2. Reduce the cost, weight, and electromechanical design requirements of multi-degree-of-freedom robots that are designed to operate with a variety of payloads.

Actuator resizing leading to cost, weight, and electromechanical design requirements of multi-degree-of-freedom robots that are designed to operate with a variety of payloads.

For redundant robots, trade off the actuator specifications of a redundant joint to distribute weight to a joint that is closer to the base rather than more distant from the base (or which otherwise contributes to lower inertial performance due to gravity of robot acceleration)

3. Reduce the weight of robot links by allowing them to become somewhat flexible (effectively reducing their stiffness), while maintaining object manipulation and positioning capabilities using task null-space control, active error correction and/or force control Reduce the weight of robot links by making them somewhat flexible, while maintaining positioning capabilities using task null-space control, active error correction and force control 4. Enhance a robot's useful "object manipulation capabilities" for very heavy payloads by using alternative techniques to achieve the same manipulation outcome while engaging less of the robot's physical capabilities When faced with a heavy payload, perform a pick-place task using object manipulation strategies like sliding, rolling, or toppling items.

5. Take payload information and the type of task into account to compute and evaluate the goodness of a plurality of motion paths & by select paths from a plurality of available paths to achieve lower error in the task to be performed, or by even selecting the right robot from a plurality of robots to achieve lower error for the task to be performed.

Take control and model predictability based on the payload and the type of task being performed into account to score different ways of performing a task.

6. More effectively utilize the available electromechanical power, time & speed up robot motions by taking payload information to identify (potentially indirect or unintuitive) paths Reduce power consumption of robots carrying variable payloads.

E.g., Use the null space of a robot to modify overall power consumption profiles (by repositioning joints to move etc.) For example, pick/placing heavier payloads closer to the robot's base may conserve power.

Figure 2A:
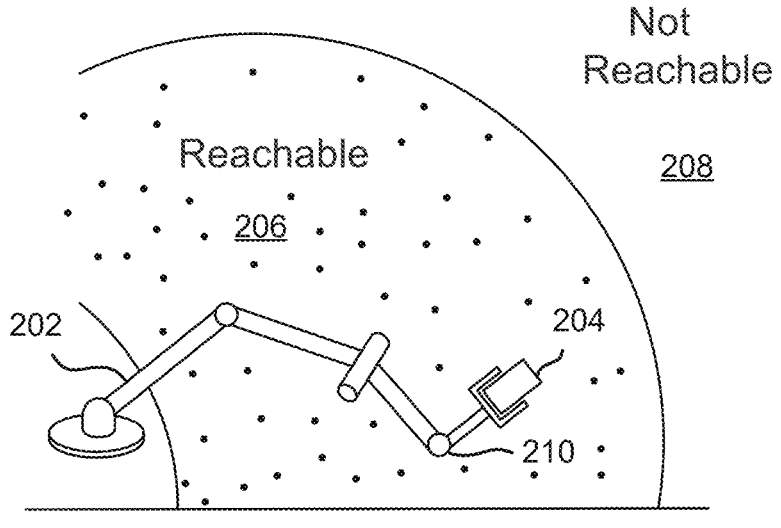
FIG. 2A is a diagram illustrating an embodiment of a traditional, non-variable payload robotic system.

FIG. 2A is a diagram illustrating an embodiment of a traditional, non-variable payload robotic system. In the example shown, robot 202 is shown as having a fixed specification, in this example a 5 kg max payload. As a result, the robot 202 may be hardwired to be limited to manipulating a payload 204 of up to 5 kg, and no more, anywhere in the reachable zone 206 that is physically reachable by the robot 202. The unreachable area 208 beyond the reach of robot 202 cannot be reached physically be robot 202, regardless of payload, in this example. Note that in the configuration/orientation shown, the torque (or other) limitation of wrist joint 210 of robot 202 may be the "weak(est) link" that requires that the payload 204 be limited to 5 kg in all regions of reachable zone 206 of robot 202.

Figure 2B:
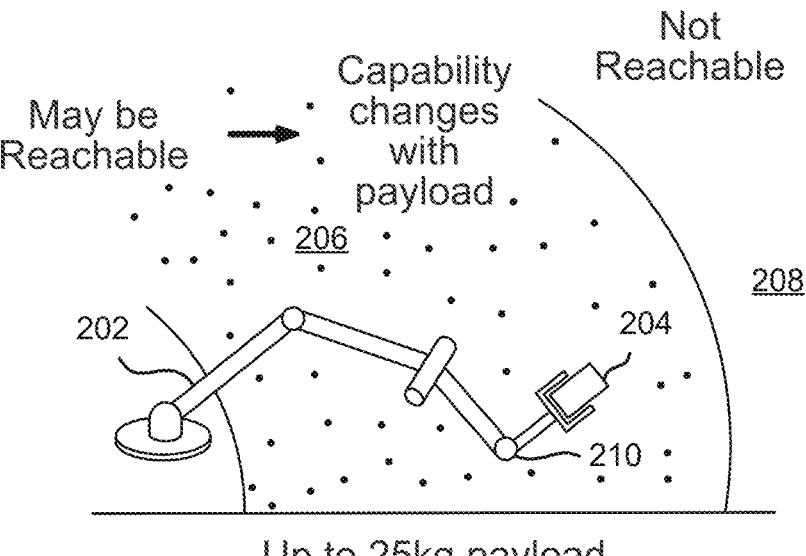
FIG. 2B is a diagram illustrating an embodiment of a variable payload robotic system.

FIG. 2B is a diagram illustrating an embodiment of a variable payload robotic system. In the example shown, techniques disclosed herein are used to enable the robot 202 to be used to manipulate larger payloads within certain portions of the physically reachable zone 206 of the robot 202. In portions of reachable zone 206 nearer to robot 202, for example, robot 202 may be able to grasp, lift, and move objects 204 having a mass up to 25 kg. For example, robot 202 may be placed in a pose similar to the one shown on the left side of FIG. 1A, reducing (or eliminating) the torque required from wrist joint 210.

In various embodiments, techniques disclosed herein enable the reachable zone 206 of the robot 202 to be transformed from a unitary reachable zone to manipulate objects up to 5 kg anywhere in the reachable zone 206 to a "may be" reachable zone 206, in which for a given object the portions that may be reached may vary and may be determined dynamically at run time.

In various embodiments, a robotic system as disclosed herein has been transitioned from a set of fixed and potentially over-conservative specifications to a regime of variable and/or dynamically-determined specifications that maximize the utility of robotic actuators and other elements in situations where the environment and/or work is dynamic, e.g., as shown in FIG. 2B.

In some embodiments, a zone of "maybe reachable" configurations and/or "maybe feasible" task capabilities is created and defined, where the feasibility of manipulating a specific object to perform a specific task of interest is determined by software computations in real-time (rather than by pre-calculated hardware features).

In some embodiments, even where reachability or feasibility is compromised, for a given task as strictly or specifically defined or conceived, the notion of task completion may be changed so that the former is regained. For example, instead of "place item I on surface S at location (X, Y, Z) with its current/specified orientation, the task may be understood to tolerate a range of solutions, including placing the item in other positions on surface and/or in other orientations that are stable.

In various embodiments, the basic criteria for computing a robot's capabilities is changed from the physical capabilities of the robot hardware (e.g., the speed of motors etc.) to the robot's ability to execute a given task. Techniques are disclosed that enable the use of weaker and less precise/repeatable robots to do the same task that would ordinarily be done using a much heavier, stronger, and more precise robot.

In some embodiments, techniques disclosed herein unlock asymmetric capabilities. For example, a joint (actuator) may be able to generate more torque and/or operate more quickly in one direction than another. In another example, a motor may be able to be operated in a first manner in cool weather but only in a second manner (e.g., lower current/torque, slower speeds, shorter duty cycle, etc.) in a higher temperature environment. In some embodiments, sensors on the robot (e.g., strain gages on limbs, force sensors, temperature sensors at each motor, etc.) and/or mathematical/computer models of the robot and/or its components may be used to inform the hardware self-aware decisions made by the robotic control system at any given time (context) as to how (best) to perform a given task.

In various embodiments, moving to a task-oriented foundation for determining the capabilities of a robot may do one or both of the following:

First, it impacts the design and selection of hardware used in the robot, or the choice of the type of robot itself—lighter weight motors, gearboxes, and limbs; lighter limbs that can handle more compressive or tensile load than bending; etc. may be used, and the full range of capabilities of components may be realized and used.

Second, once the hardware/robot is selected, it impacts how the robot is used.

Both types of impact are discussed herein with suitable examples.

Intelligent Dynamic Control to Ensure Task Completion.

Figures 3A, 3B, 3C, 3D:
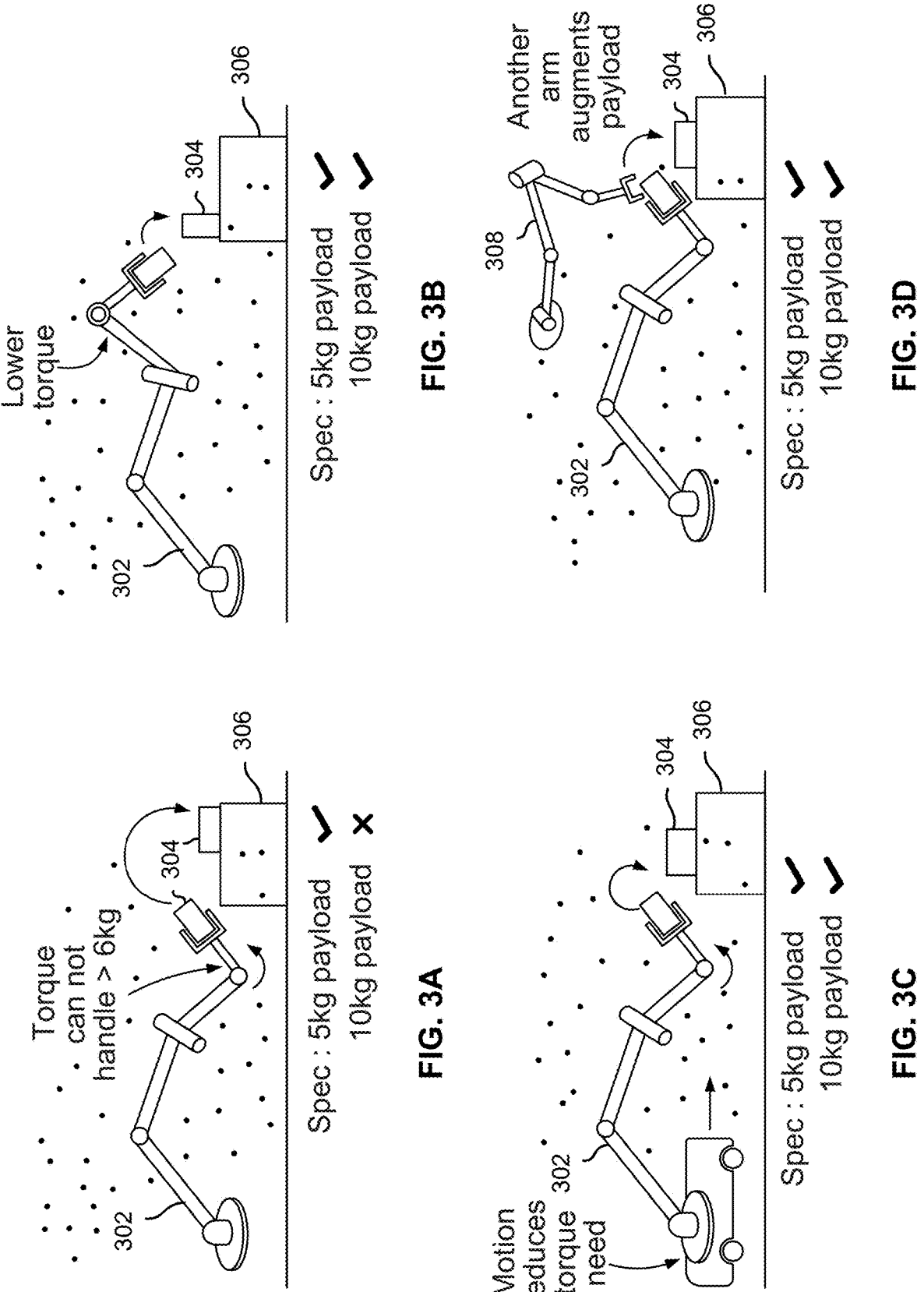
FIG. 3A is a diagram illustrating an embodiment of a traditional, non-variable payload robotic system.
FIG. 3B is a diagram illustrating an embodiment of a variable payload robotic system.
FIG. 3C is a diagram illustrating an embodiment of a variable payload robotic system.
FIG. 3D is a diagram illustrating an embodiment of a variable payload robotic system.

FIG. 3A is a diagram illustrating an embodiment of a traditional, non-variable payload robotic system. In the example shown, robotic arm 302 is used to place an object 304 in a specified location and orientation on the top surface of object 306. The robot 302, in this example, is hardwired to be limited to placing an object that is up to 5 kg anywhere within the reachable area of the robot 302 (indicated in FIG. 3A by the dots. A 10 kg object, for example, could not be manipulated in any part of the reachable area of robot 302.

FIG. 3B is a diagram illustrating an embodiment of a variable payload robotic system. In the example shown, the capabilities of robot 302 to lift heavier payloads are augmented by changing the robot's posture (e.g., wrist joint in a less stressed position) or the item's final position and/or orientation while placing (i.e., standing on end, instead of lying flat, and in a location nearer to the robot 302). In various embodiments, a system as disclosed herein may be configured to redefine or request adjustments to the task definition to determine a feasible plan and/or trajectory. For example, in the example shown, the task may have been specified as placing object 304 on top of object 306, without specifying the location or orientation. Or, the system may have determined that given the weight of object 304 it was not feasible to place the object 304 in the position originally specified, e.g., the position and orientation shown in FIG. 3A, and may have requested a different placement and/or orientation. A higher level (or peer level) algorithm/module, such as one configured to determine how to stack items to achieve a dense and stable packing, may have been asked to determine an alternate or updated packing plan, e.g., to allow the object 304 to be placed as shown in FIG. 3B, instead of as shown in FIG. 3A.

FIG. 3C is a diagram illustrating an embodiment of a variable payload robotic system. In the example shown, to reduce the torque requirements on weaker joints, such as the wrist joint of robot 302, robot 302 is disposed on a mobile base. Motion of the mobile base is used, in the example shown in FIG. 3C, to reduce the torque required to be provided by weaker joints, such as the wrist joint of robot 302, to move the object 304 into the position and orientation as shown.

FIG. 3D is a diagram illustrating an embodiment of a variable payload robotic system. In the example shown, robot 302 and/or a control computer associated with robot 302 has determined that robot 302 cannot manipulate object 304 on its own. In response, robot 302 is shown as having engaged another robot 308 for assistance. The ability to dynamically invoke assistance from robot 308, in this example, increases the operational capacity of the robotic system of FIG. 3D.

In various embodiments, a robot as disclosed herein first determines whether a task to pick and place an object is feasible within the robot's payload capacity across its entire workspace. If so, conventional approaches to planning and implementing a trajectory may be used. To pick and place heavier objects and extend the variable payload capacity of a robot, in various embodiments, the system computes dynamically how the specific object can be picked and placed. In some embodiments, this is done by integrating the controller with the task planner to accommodate three consequential scenarios that "change capabilities":

1. Changing the manner in which the robot does the task. This includes changing the posture, the grasping style, the placing style, or changing the order in which a sequence of tasks is done. See, e.g., FIG. 3B.
2. Using mobility as a tool to augment payload capacity by moving the robot into positions where weaker joints see lesser load. See, e.g., FIG. 3C
3. Using robot collaboration to allow multiple robots to assist each other. See, e.g., FIG. 3D.

Intelligent Dynamic Control to Ensure Task Completion.

In various embodiments, we reduce the cost, weight, and electromechanical design requirements of multi-degree-of-freedom robots that are designed to operate with a variety of payloads. We no longer need to use a robot every joint and limb of which is rated to handle in all poses the heaviest load the robot may be needed to handle.

Actuator resizing leading to cost, weight, and electromechanical design requirements of multi-degree-of-freedom robots that are designed to operate with a variety of payloads.

For redundant robots, trade off the actuator specifications of a redundant joint to distribute weight to a joint that is closer to the base rather than more distant from the base (or which otherwise contributes to lower inertial performance due to gravity of robot acceleration)

No longer need every link/joint to be able to handle a single rated load. Size/weight/cost driven by task feasibility, not single/static rated max load.

Additional use cases include:

traditional 6 degree of freedom ("DOF") serial manipulator arms.

when adding a 7th DOF in a serial manipulator

8 DOF serial manipulators as shown in the examples in FIGS. 3A-3D.

Adding additional DOFs in an existing serial chain manipulator design often means adding the dense motor/gearbox assemblies at the additional joints. In various embodiments, techniques disclosed herein are used to minimize the needed power/size/mass of the new actuators. For example, not every joint needs to be able to supply torque sufficient to move the remaining down-limb elements of the arm and the maximum rated payload of the robot. This approach allows re-allocation of performance capacity of existing base-side actuators, that are now carrying the additional DOF (i.e., motors and other structures comprising added joints and/or added DOF at preexisting joints); such that the added mass of the new DOF(s) can be carried while handling a task-based payload as disclosed herein.

In various embodiments, this optimization is generalized to 6-DOF robots, 7-DOF, 8-DOF, and even 12-16-DOF systems. For the high degree of freedom systems, this is realized in some embodiments as a dual or triple arm system. Each (smaller) arm itself can be independent when working on smaller payloads within its workspace, but when combined and as a bimanual pick, the usable workspace and payload limits increase drastically.

This can be seen as one robot helping the other lift a heavy object or in an out-of-spec orientation, even only in particular zones, instead of the whole trajectory.

In various embodiments, motor sizes and weights are reduced to still complete the full task needed by the robots. However, the same methodology is still applied when reducing motor power as well. For example, in some embodiments, the motor size is kept high, but total system power is allocated dynamically to individual motors. This virtually limits the motor strength (similar to reducing its size and weight) and creates the same zones of usage as shown above. Even better, dynamically reducing power on a per motor basis allows for changing the zones on the fly. This is another optimization used to decrease the size and capability of the power electronics of the system (there is no need to size the electronics to power the robot to 100% full power on every joint).

Effectively Operate Flexible Low-Weight Robots.

In various embodiments, the weight of robot links is reduced by allowing at least some components to be somewhat more flexible than in a conventional robot (effectively reducing their stiffness), while maintaining object manipulation and positioning capabilities using task null-space control, active error correction and/or force control Reduce the weight of robot links by making at least some components (e.g., limbs) somewhat flexible, while maintaining positioning capabilities using task null-space control, active error correction and force control E.g., "dangle" a heavier payload, as described above, to allow a more flexible (less stiff or rigid) material to be used for the link/limb connected to the wrist. At runtime, simulation may be used to realize that given the weight of the payload using the robot in the "dangling" pose minimizes the strain on the more flexible limb.

In some embodiments, a joint or other structure other than a link/limb may be more flexible than in a conventional robot. For example, less precision (e.g., due to more flexible links/limbs and/or joints) may be tolerated for certain tasks, such as picking and placing a large box or package, enabling control to be performed as disclosed herein despite bending and/or oscillations that may occur due to the use of lighter weight but more flexible links/limbs, joints, etc.

In some embodiments, simulation is used to investigate the suitable stiffness or mechanical properties required of a robot based on design requirements for performing a given task or set of tasks within the expanded set of capabilities discussed above.

Use Payload Information for Dynamic Path & Motion Control.

In various embodiments, a robot's useful "object manipulation capabilities" are enhanced for very heavy payloads by using alternative approaches as disclosed herein to achieve the same manipulation outcome while engaging less of the robot's physical capabilities. When faced with a heavy payload, a pick-place task may be performed using unconventional object manipulation strategies like sliding, rolling, or toppling items. Different "zones of usage" may be defined to specify reachable areas in which robot capabilities (e.g., max payload) may be expanded.

Figure 4:
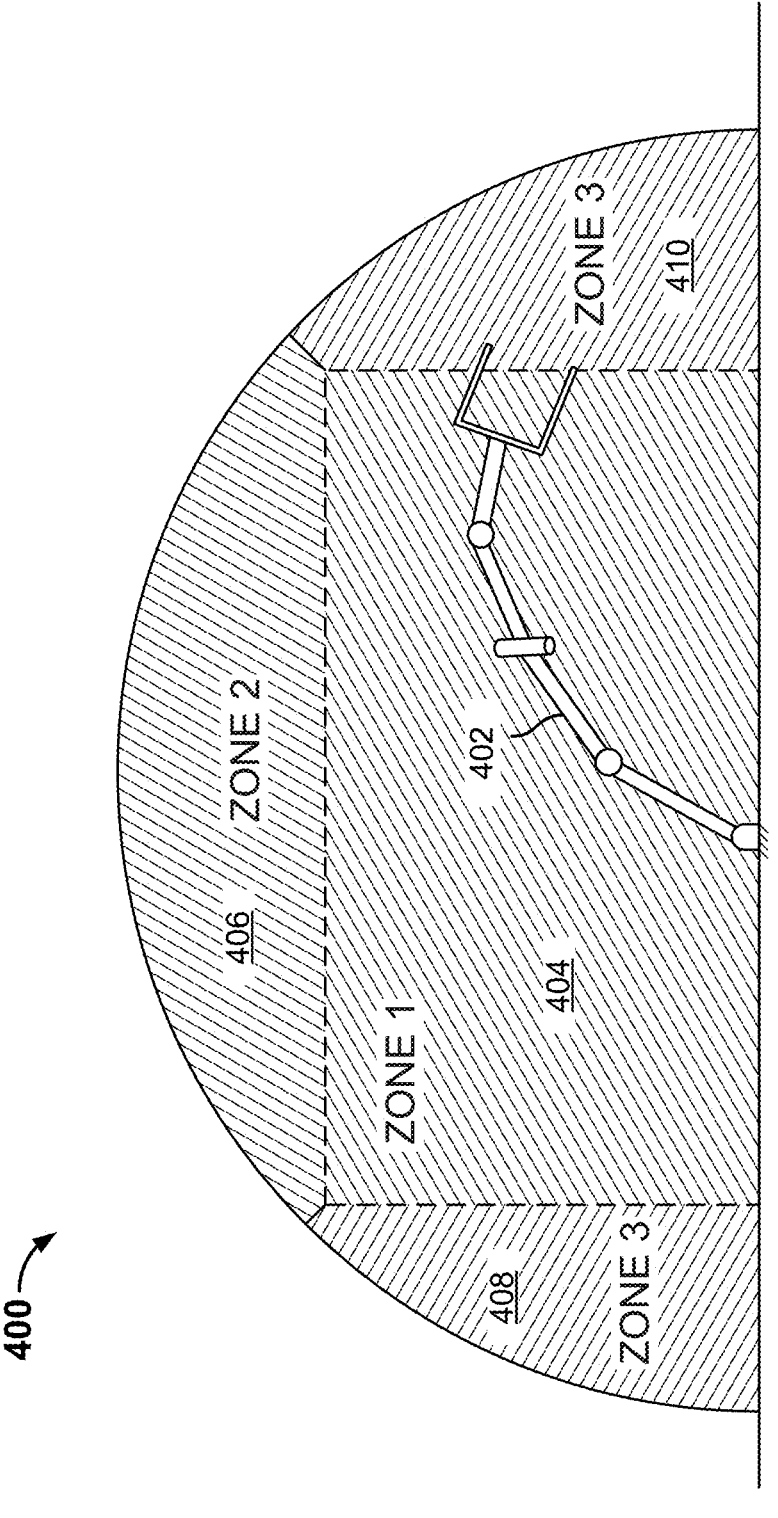
FIG. 4 is a diagram illustrating an embodiment of a variable payload robotic system.

FIG. 4 is a diagram illustrating an embodiment of a variable payload robotic system. In the example shown, system 400 includes a robotic arm 402 for which distinct operational zones, including zone 1 (404), zone 2 (406), and zone 3 (408 and 410) are defined.

Each zone (404, 406, 408 and 410) may have different operating characteristics/limits, e.g.:

zone 1: Max payload and limited wrist orientation.
  zone 2: less payload with maximum flexibility in wrist orientation.
  zone 3: similar to zone 2, but constraints on joints due to max torque needed by joints to hold the end object (+end effector mass).

The example in FIG. 4 shows three task/performance regimes, for example, but more or fewer regimes could be used. Having a small number of these is most useful when optimizing the motor/gearbox choice at each joint across a small number of standard motor/gearbox combinations. However, depending on the nature of the task(s) and the variety of payloads, more or fewer zones may be defined and used.

Compute Useful Workspace Focused on Task Capabilities, not Just Reachability.

In various embodiments, payload information and the type of task are considered to compute and evaluate the goodness of a plurality of motion paths and/or to select paths from a plurality of available paths to achieve lower error in the task to be performed, or by even selecting the right robot from a plurality of robots to achieve lower error for the task to be performed.

In various embodiments, a system as disclosed herein determines feasibility and/or selects a plan/trajectory based on the payload and the type of task being performed. Different feasible ways to perform a given task may each be assigned a score, and the scores used to select a plan.

In some embodiments, the mass/inertia of the object being manipulated may be combined with the weight of the last link(s) and/or joints of the robot, which changes the effective dynamic behavior of the combined system and effectively changes the instantaneous acceleration profiles and resulting optimal full-trajectory path profiles. This effect is particularly enhanced when the inertia of the object is non-negligible compared to the inertia of the robot (as will be true for light robots lifting heavier payloads, and/or when multiple robots lift an item)

For example, when considering moving a heavy box, say two paths are valid (a) move the box close to the base (hug it) and do a complex motion so that the arm isn't extended or (b) balance the box against a ledge and slide it to a goal position. Both work, but the controllability of (a) is better if we select a robot with a stiff body (expensive) but no force control (cheaper) and (b) is better if we select a robot with a flexible body (cheaper, lighter) but good force control (expensive).

The robot may have knowledge of payload mass. Examples are knowledge of payload mass from work planning software, weigh station at pickup point, wrist-mounted force sensor. Using knowledge of payload mass, and a task-payload map (see FIG. 4, e.g.), the motion planner chooses an appropriate path and destination.

The software (e.g., motion planner) used to provide the capabilities described herein, in some embodiments, creates motions for the robot that fall within the (dynamically/ variably defined) envelope of max specifications for the robot. It will take the knowledge of payload mass to plan a motion within the constraints of each joint—be it electrical, torque, etc.

In some embodiments, this same software is used to simulate trajectories with different payloads and maneuvers. The robot design may be iterated, in some embodiments, given the detailed capabilities on a per box level. During operation, the robot can also use simulation to decide between different locations to place a box given the physical joint limits.

Optimize Robot Power Consumption Using Dynamic-Load Cost Calculations.

In various embodiments, the available electromechanical power, time, and speed capabilities of the robot are used more effectively, e.g., speed up robot motions by taking payload information into account to identify (potentially indirect or unintuitive) paths. For example:

reduce power consumption of robots carrying variable payloads, e.g., by planning motion to minimize power consumption given knowledge of the robot's variable capacity and power consumption for a given payload in different postures/zones/trajectories.

E.g., Use the null space of a robot to modify overall power consumption profiles (by repositioning joints to move etc.).

Many ways to do a task, choose one that uses less power.

Using two robots cooperatively might use less power than using one.

Take into consideration the number of robots available to help, if any, whether any/all are on battery versus outlet power, time of day or maximum current/usage limits on circuit(s), etc.

For example, a single robot plugged into a wall outlet of other non-battery power supply may be operated with less consideration given to power consumption than a single robot on battery. In the latter case, battery charge level, charger availability and utilization, down time to charge, etc. may need to be considered in real time to determine how to use the robot's capabilities to do a task. For example, a lower power way of doing the task more slowly may be selected.

In another scenario, multiple robots may be used in concert in a manner that minimizes collective use of power. For example, using a single robot may be more energy efficient for some tasks, or using many robots at the same time may increase speed but exceed a limit on instantaneous power consumption.

Figure 5:
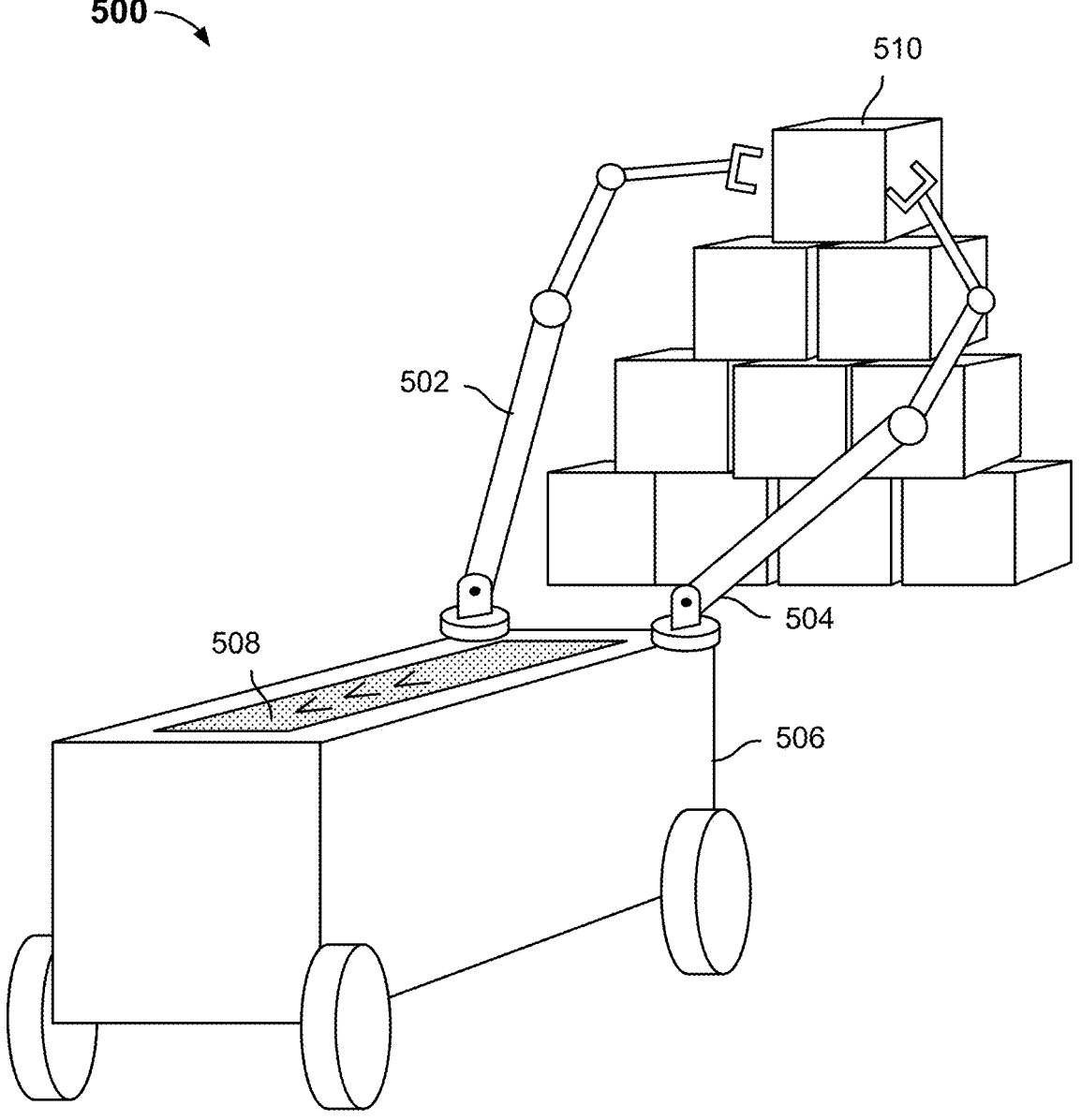
FIG. 5 is a diagram illustrating an embodiment of a variable payload robotic system.

FIG. 5 is a diagram illustrating an embodiment of a variable payload robotic system. In the example shown, a robotic system 500 includes a truck loader robot comprising left and right robotic arms 502, 504 disposed on a robotically controlled mobile chassis 506, with a longitudinally oriented central conveyor 508 disposed between the robotic arms 502, 504. In an unloading operation, the robot 502, 504, 506, 508 picks boxes 510 from within the truck (or other container) and places them on the central conveyor 508, which conveys the boxes 510 to the rear of the truck loader, for example to a human or other robotic worker, to a conveyance structure that conveys the boxes 510 further downstream, etc.

In a loading operation, conversely, boxes 510 may arrive at the rear end of the truck loader and be conveyed by conveyor 508 to a position from which one or both of the robotic arms 502, 504 may be used to pick the boxes 510 and place them in locations that achieve required density and stability, for example.

In various embodiments, techniques disclosed herein are used to operate the robotic system of FIG. 5. For example, one of the robotic arms 502, 504 may be used to pick and place a smaller item, but both may be used cooperatively to pick and place a larger and/or heavier item. In some embodiments, variable payload techniques are applied to allow heavier items to be unloaded than the truck loader would be capable of loading, e.g., to or from a given position. For example, an item that may be too heavy for the truck loader to lift from conveyer 508 and place in a given location, e.g., at the top of a stack or layer, may be deemed within the capabilities of the truck loader if the same object is instead being unloaded. In unloading, the robotic arms 502, 504 could be used to pull a heavy object from the top of a stack and lower it to the conveyor 508 in something like a controlled fall, in which gravity is used to bring the item to the conveyor 508, with a retarding force/torque being provided by the robotic arms 502, 504 to slow the rate of descent and ensure the object is not damaged.

Figure 6A:
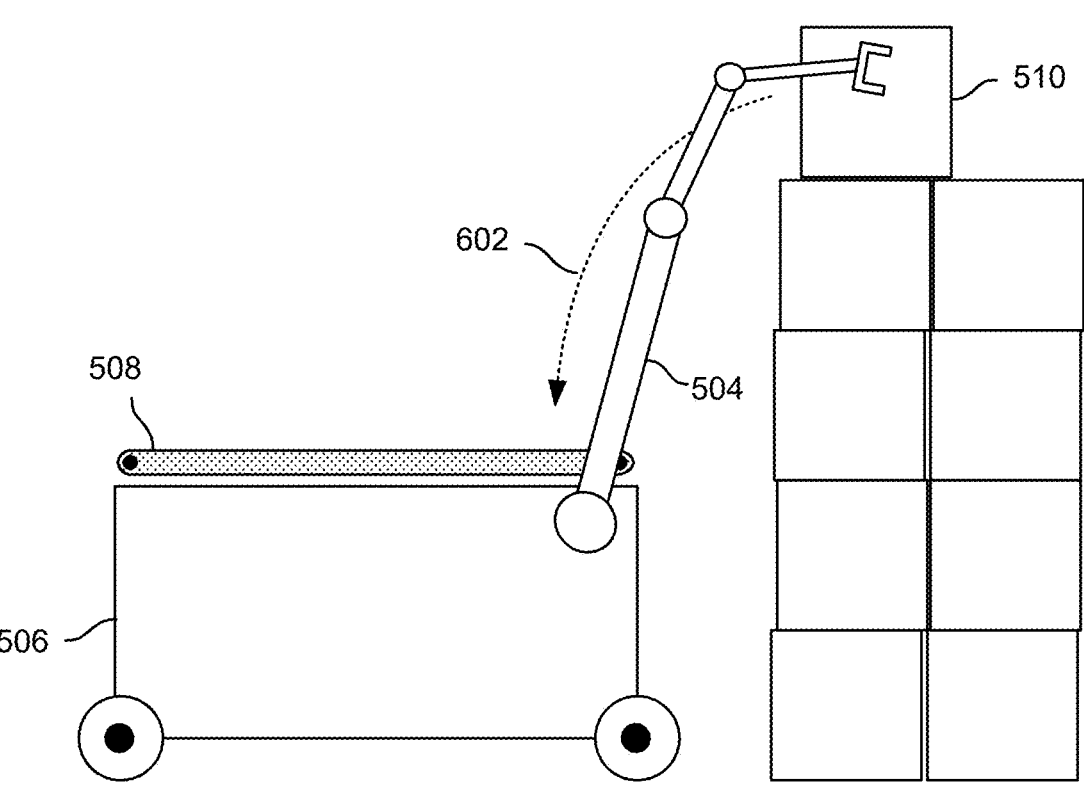
FIG. 6A is a diagram illustrating an embodiment of a variable payload robotic system.

FIG. 6A is a diagram illustrating an embodiment of a variable payload robotic system. In the example and state shown, the truck loader of FIG. 5 is being used to initiate translation of box 510 along a trajectory 602 at least in part using gravity to cause the box 510 to move from the position shown to the conveyor 508, e.g., to an ending location as illustrated in FIG. 6B.

Figure 6B:
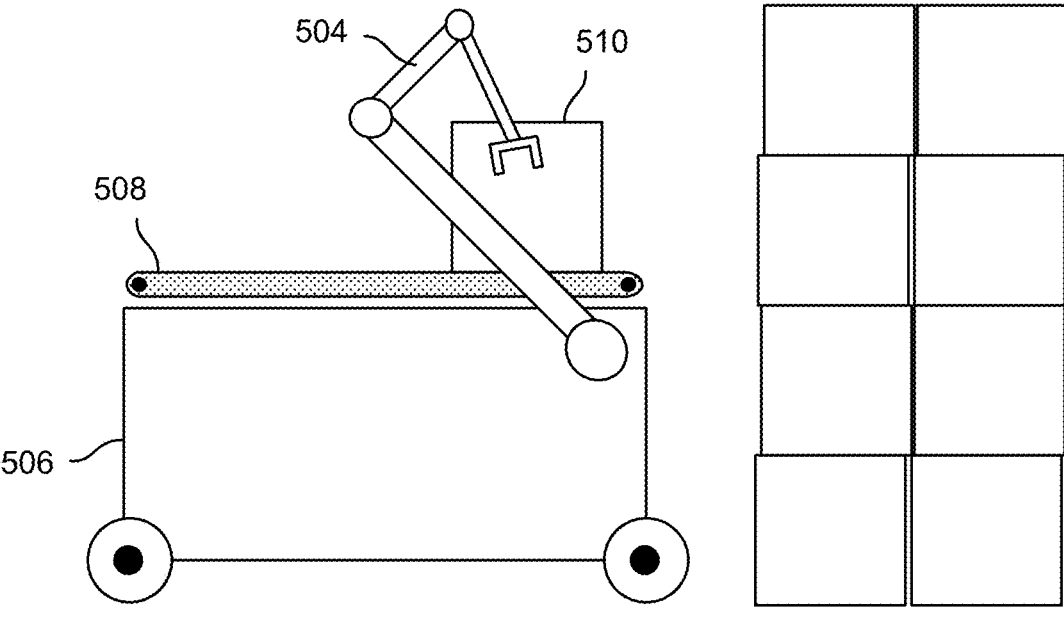
FIG. 6B is a diagram illustrating an embodiment of a variable payload robotic system.

In some embodiments, the weaker, more distal joints to robotic arms 502, 504 may be locked into position, allowing gravity countered in part by the stronger joints of the robotic arms 502, 504 to be used to bring the box 510 to the position as shown in FIG. 6B.

In various embodiments, techniques illustrated by FIGS. 6A and 6B and described above may allow the truck loader of FIG. 5 to be used to unload objects that are much heavier than the truck loader would be able to load into a similar position, e.g., starting form the position as shown in FIG. 6B to a location as shown in FIG. 6A.

Figure 7:
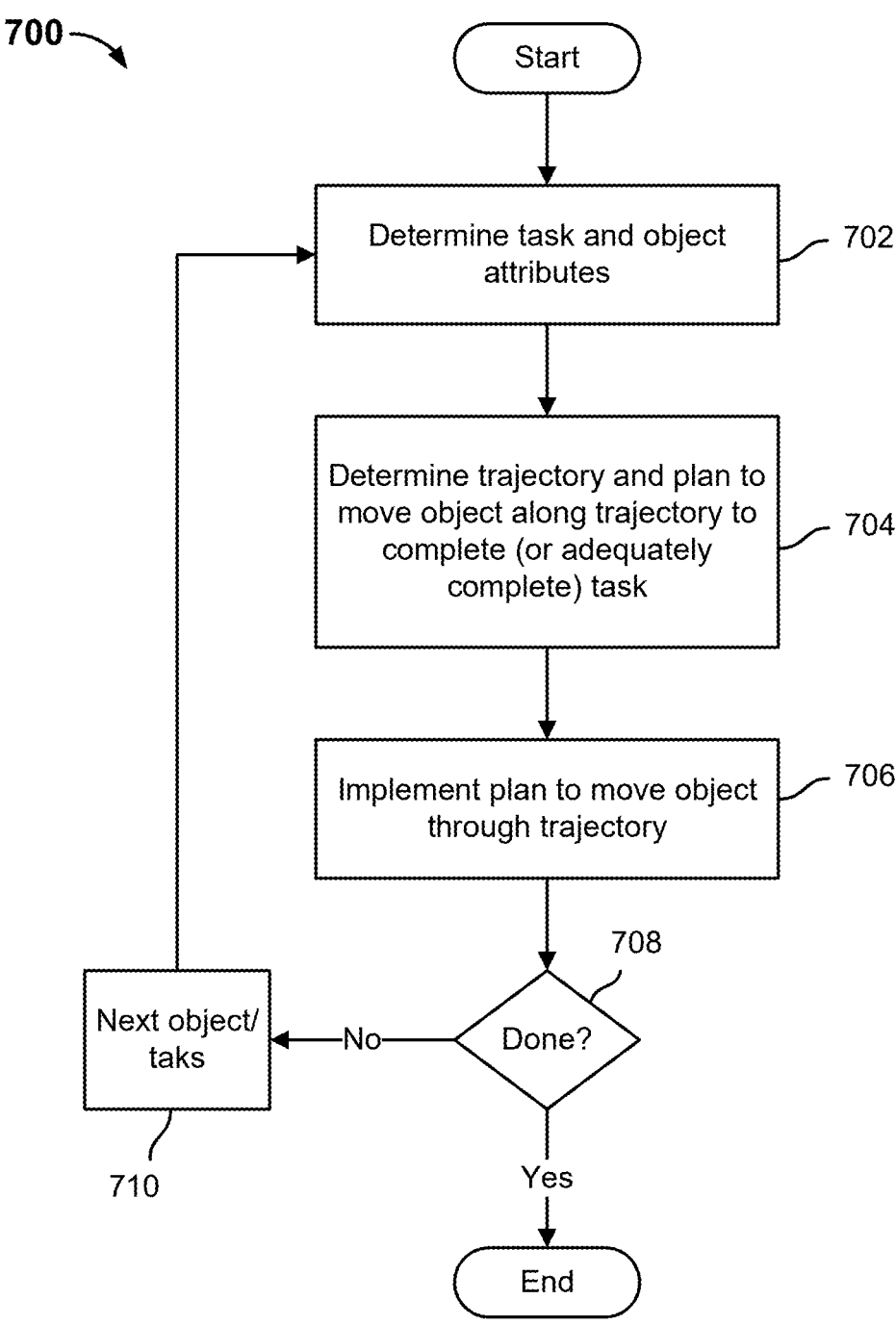
FIG. 7 is a flow diagram illustrating an embodiment of a process to operate a variable payload robotic system.

FIG. 7 is a flow diagram illustrating an embodiment of a process to operate a variable payload robotic system. In various embodiments, the process 700 of FIG. 7 may be implemented by a control computer, such as control computer 126 of FIG. 1B. In the example shown, at 702, a task to be performed and one or more attributes of an object with respect to which the task is to be performed are determined. For example, a higher-level planner/scheduler may assign a task to pick a specific object from a source location and place the object in a destination location and a prescribed orientation, or at one of a set or range of permissible locations and/or orientations. At 704, a trajectory and plan to grasp and move the object along the trajectory to complete (or adequately, sufficiently, and/or permissibly complete) the task is determined. In various embodiments, techniques disclosed herein are used at 704 to determine, based at least in part on the object attribute(s) determined at 702, the plan and trajectory. At 706, the plan determined at 704 is implemented. Once the object has successfully been placed, it is determined at 708 whether other tasks are to be performed. If so, the process advances via 710 to determine and perform a next task. If no other tasks are to be performed (708), the process 700 ends.

Figure 8:
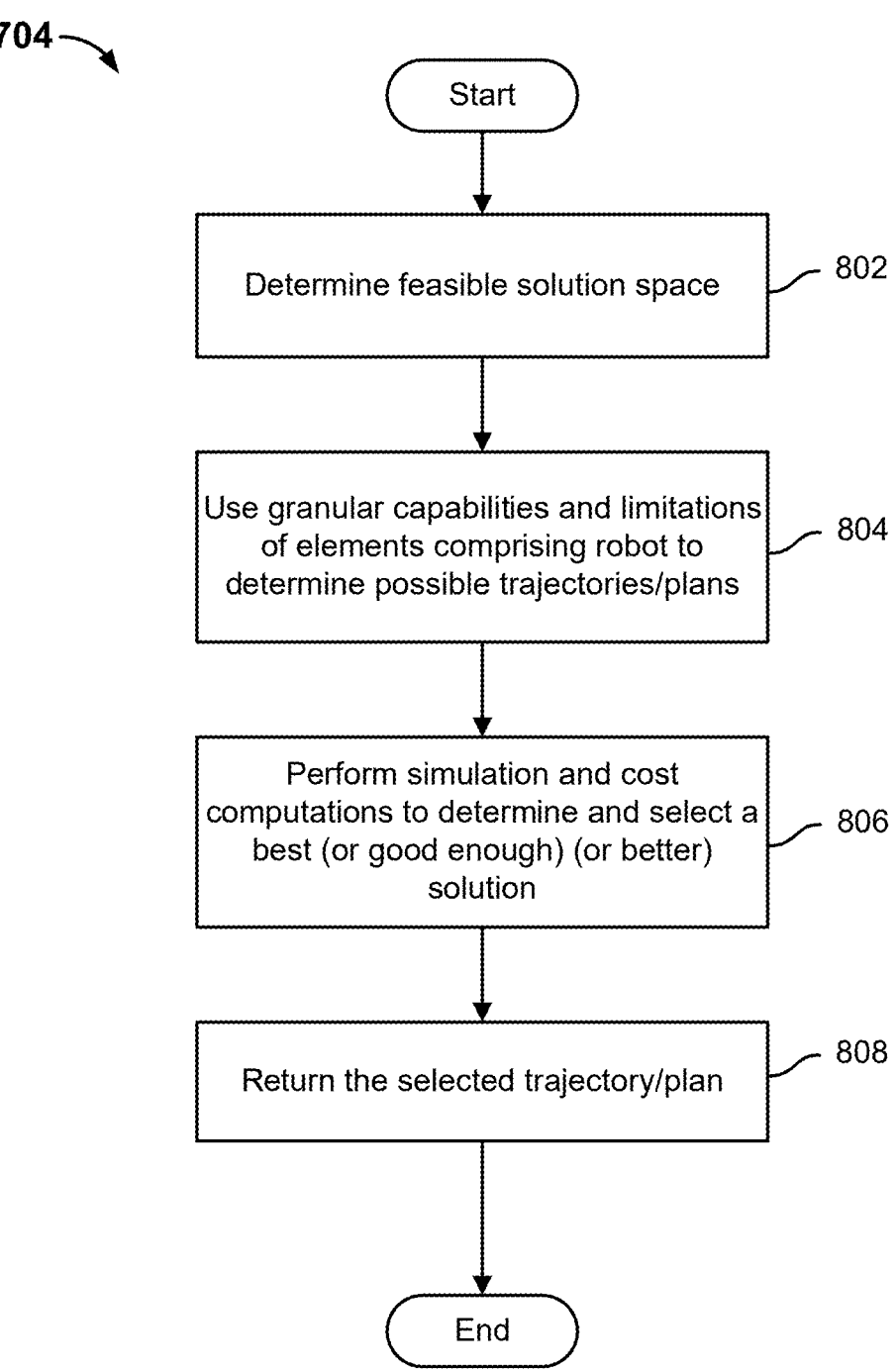
FIG. 8 is a flow diagram illustrating an embodiment of a process to plan a trajectory to operate a variable payload robotic system.

FIG. 8 is a flow diagram illustrating an embodiment of a process to plan a trajectory to operate a variable payload robotic system. In various embodiments, the process of FIG. 8 may be used to perform step 704 of process 700 of FIG. 7. In the example shown, at 802, a feasible solution space is determined. For example, a set of solutions that includes only solutions that are feasible with respect to a given payload may be determined. Or, a zone associated with solutions that are feasible given the payload is selected, see, e.g., FIG. 4. At 804, the granular capabilities and limitations of elements comprising the robot are considered to determine specific trajectories and/or plans to perform the task. For example, the torque capability and/or limits of each joint and/or the weight bearing limits for joints and/or links between them in different configurations, orientations, etc. may be considered. At 806, simulations and/or cost computations are performed to determine and select a best (or good enough, or at least better than the best so far) solution to pick and place the object. At 808, the selected plan and/or trajectory is returned as a result.

In various embodiments, supervised and/or other machine learning may be used to learn strategies, trajectories, etc. to perform pick/place tasks with respect to objects having varying attributes (size, weight, etc.), given the joint/link level capacity and/or limitations of elements comprising a robot. For example, heavier objects may be moved through different trajectories within different operating zones to train a model usable to predict, for a given potential plan and/or trajectory, whether the plan and/or trajectory is or may be feasible, and to assign a confidence, fit, or other score to the plan and/or trajectory.

Figure 9A:
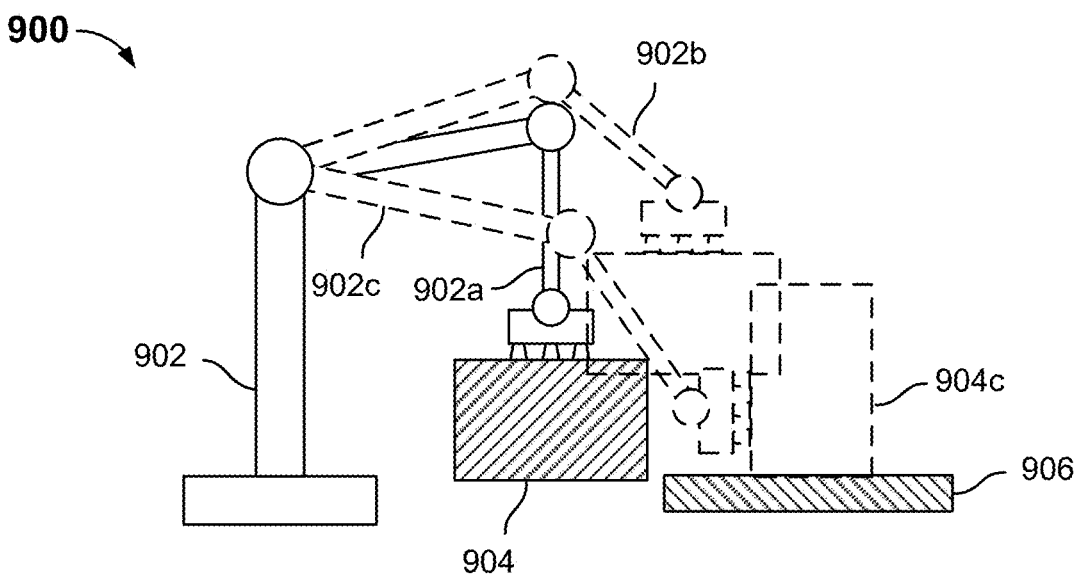
FIG. 9A is a diagram illustrating an embodiment of a variable payload robotic system.

FIG. 9A is a diagram illustrating an embodiment of a variable payload robotic system. In the example shown, system 900 includes robotic arm 902 being used to move box 904 through a trajectory through which robotic arm 902 is moved through positions and poses 902a, 902b, and 902c to place the box 904 onto a pallet 906 in a destination position and orientation 904c. The trajectory illustrated by FIG. 9A may be an example of a potentially feasible plan and trajectory such as may be considered at 804 and/or 806, in some embodiments.

Figure 9B:
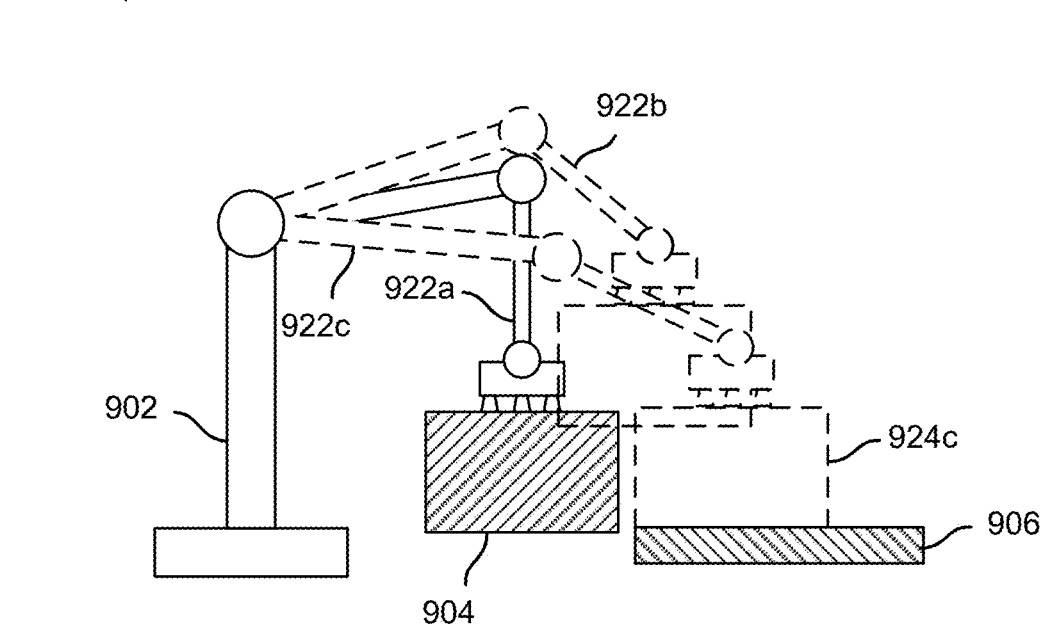
FIG. 9B is a diagram illustrating an embodiment of a variable payload robotic system.

FIG. 9B is a diagram illustrating an embodiment of a variable payload robotic system. In the example shown, the robotic system 920 includes the same robotic arm 902 of FIG. 9A moved through a different trajectory 922a, 922b, 922c to place the box 904 in the alternate position 924c as shown. In various embodiments, the trajectory illustrated by FIG. 9B comprises a further example of a potentially feasible plan and trajectory such as may be considered at 804 and/or 806.

In various embodiments, a system as disclosed herein may consider alternate trajectories, placements, and orientations, such as those shown in FIGS. 9A and 9B, to determine and select a feasible and preferred plan and trajectory. Aspects of each plan and the result achieved (e.g., cost to grasp, move, and place the item; impact of each plan on downstream cost to place other items around the item, etc.) may be considered to determine and select a trajectory and/or plan. For example, the trajectory and plan of FIG. 9A may be preferred to a lighter box 904, particularly if the resulting placement facilitated the lower cost (or greater value, e.g., higher density, more stable) packing of other boxes on or around the box 904, while the trajectory and plan of FIG. 9A may be preferred if the box 904 is too heavy to move and/or place as shown in FIG. 9A, e.g., due to torque limits of the wrist joint of robotic arm 902.

Figure 10:
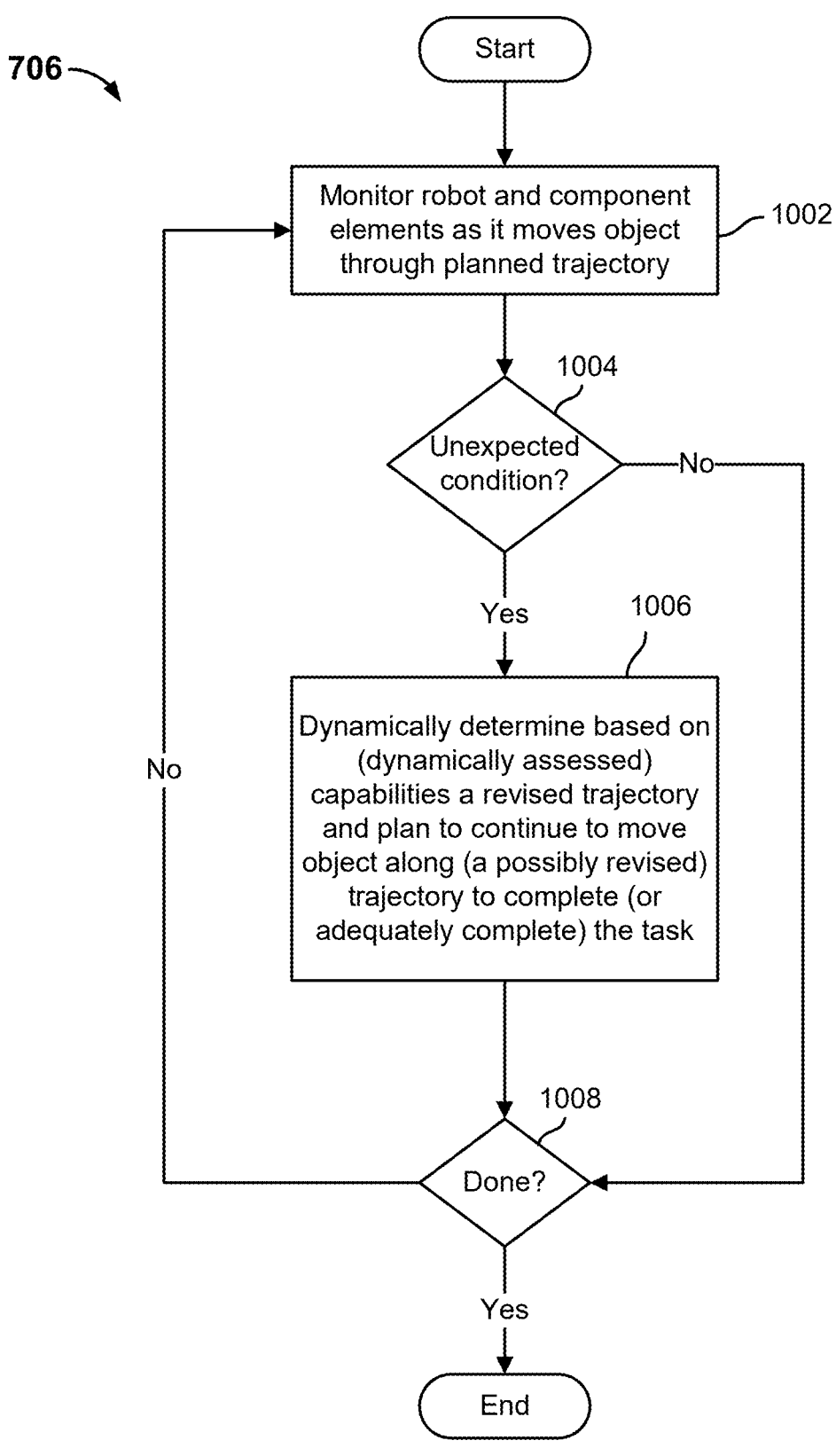
FIG. 10 is a flow diagram illustrating an embodiment of a process to implement a planned trajectory to operate a variable payload robotic system.

FIG. 10 is a flow diagram illustrating an embodiment of a process to implement a planned trajectory to operate a variable payload robotic system. In various embodiments, the process of FIG. 8 may be used to perform step 706 of process 700 of FIG. 7. In the example shown, at 1002 the robot and its component elements (e.g., joint motors, gripper sensors) are monitored as the robot is used to move an object through a planned trajectory. If at 1004 an unexpected condition is detected, e.g., the object is heavier than expected or the robot is unable to maintain the originally planned trajectory, at 1006 a revised trajectory and plan are determined, based on the dynamically assessed conditions and the granular capability of the components comprising the robot, such as the torque capacity at each joint. For example, the robotic system may determine to move the load more quickly towards the destination, as a human might do if a heavy item were slipping from their hands or was becoming to hard to continue to carry, then apply a burst of torque as needed near the end of the trajectory to lift and place the object into place. Or, a plan may be revised to place the item at a different end location and/or orientation. Or, in still another example, assistance may be obtained from another robot, or a human worker. One the unexpected condition has been addressed (1004, 1006), monitoring continues (1002) and further adjustments made (1004, 1006) as/if needed, until is determined at 1008 that the task has been completed, at which point the process of FIG. 10 ends.

In some embodiments, step 1006 is performed at least in part by a feedback control component or module. As the actual trajectory via which the object is moved deviates from the plan, the feedback control component or module generates commands, considering the joint and other granular level capabilities of the components comprising the robot, to return the object to travel along the originally planned trajectory or, failing that, along a newly computed trajectory to the destination.

In various embodiments, techniques disclosed herein enable a robotic system to perform tasks more efficiently, perform tasks with respect to payloads that might exceed what would traditionally have been defined as the single, static maximum payload, and/or enable robot designs that are lighter, lower cost, and/or consume less power to provide the same capabilities.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a robot comprising two or more joints, each actuated by an associated joint motor and each joint motor having a different capacity, the robot comprising an end effector configured to grasp an object; and a processor coupled to the robot and configured to determine based at least in part on the respective capacities of at least a subset of the joint motors and a payload related attribute of the object a plan and trajectory to move the object from a source location to a destination location;

wherein a wrist joint included in the two or more joints has a capacity that is less than one or more other of the two or more joints and the processor is configured to determine the plan and trajectory based at least in part on a determination of which of a plurality of operating zones the object is located in relative to the robot, the plurality of operating zones including a first zone with respect to which the robot can manipulate a maximum payload but with limited wrist joint orientation and a second zone with respect to which the robot can manipulate only payloads that are less than the maximum payload but with maximum flexibility in wrist joint orientation.

2. The system of claim 1, wherein the payload related attribute comprises a weight of the object.

3. The system of claim 2, wherein the processor is further configured to determine the weight of the object.

4. The system of claim 3, wherein the weight is determined based on a sensor comprised in the robot.

5. The system of claim 3, wherein the processor is configured to determine the weight of the object based at least in part on image data.

6. The system of claim 2, wherein the processor is configured to determine one or more operating zones, within a maximum operational reach of the robot, within which the robot is capable of moving the object.

7. The system of claim 2, wherein the processor is configured to determine a feasible set of trajectories to move the object, based at least in part on the respective capacities of said at least a subset of the joint motors and the payload related attribute of the object.

8. The system of claim 7, wherein the feasible set of trajectories includes only trajectories within a subset of the operating space that is physically reachable by the robot, the subset being determined based at least in part on the payload related attribute of the object.

9. The system of claim 1, wherein the processor is further configured to monitor the robot as the object is moved through the trajectory.

10. The system of claim 9, wherein the processor is configured to detect a condition and to determine a revised trajectory in response to detecting the condition.

11. The system of claim 1, wherein the processor is configured to determine the plan and trajectory at least in part by using a stored model reflecting the respective capacities of the joint motors.

12. The system of claim 11, wherein the model is trained at least in part by supervised machine learning.

13. The system of claim 1, wherein the processor is configured to use simulation to determine a set of feasible set of trajectories to move the object from the source location to the destination location given the respective capacities of the joint motors.

14. The system of claim 13, wherein the processor is further configured to use simulation in real time to adapt the plan and trajectory in response to a condition detected while moving the object from the source location to the destination location.

15. The system of claim 1, wherein the processor is configured to determine one or both of an alternate location at which and an alternate orientation in which to place the object.

16. The system of claim 1, wherein the determined plan and trajectory includes operating a mobile chassis on which the robot is mounted to impart momentum to the object.

17. The system of claim 1, wherein the object is being moved to the destination location that is nearer to the ground than the source location, and the determined plan and trajectory relies at least in part on gravity to move the object through the trajectory.

18. The system of claim 1, wherein the robot comprises a first robot and the processor is further configured to obtain assistance from a second robot to move the object through at least a portion of the trajectory.

19. A method to programmatically control a robot comprising two or more joints, each actuated by an associated joint motor and each joint motor having a different capacity, the robot comprising an end effector configured to grasp an object, the method comprising:

receiving an indication to move an object from a source location to a destination location; and using a processor to determine based at least in part on the respective capacities of at least a subset of the joint motors and a payload related attribute of the object a plan and trajectory to move the object from the source location to the destination location;

wherein a wrist joint included in the two or more joints has a capacity that is less than one or more other of the two or more joints and the processor is configured to determine the plan and trajectory based at least in part on a determination of which of a plurality of operating zones the object is located in relative to the robot, the plurality of operating zones including a first zone with respect to which the robot can manipulate a maximum payload but with limited wrist joint orientation and a second zone with respect to which the robot can manipulate only payloads that are less than the maximum payload but with maximum flexibility in wrist joint orientation.

20. A computer program product to programmatically control a robot comprising two or more joints, each actuated by an associated joint motor and each joint motor having a different capacity, the robot comprising an end effector configured to grasp an object, the computer program product being embodied in a non-transitory computer readable medium and comprising computer instructions for:

receiving an indication to move an object from a source location to a destination location; and using a processor to determine based at least in part on the respective capacities of at least a subset of the joint motors and a payload related attribute of the object a plan and trajectory to move the object from the source location to the destination location;

wherein a wrist joint included in the two or more joints has a capacity that is less than one or more other of the two or more joints and the processor is configured to determine the plan and trajectory based at least in part on a determination of which of a plurality of operating zones the object is located in relative to the robot, the plurality of operating zones including a first zone with respect to which the robot can manipulate a maximum payload but with limited wrist joint orientation and a second zone with respect to which the robot can manipulate only payloads that are less than the maximum payload but with maximum flexibility in wrist joint orientation.

* * * * *